(12) United States Patent
Schneck et al.

(10) Patent No.: US 6,881,306 B2
(45) Date of Patent: Apr. 19, 2005

(54) COMBINATION ELECTRODE FOR ELECTROCHEMICAL RESTORATION OF CORROSION-DAMAGED REINFORCED CONCRETE AND METHOD OF CONTROLLING SAME

(76) Inventors: Ulrich Schneck, Alemannenstrasse 4, D-01309 Dresden (DE); Thomas Winker, Dientzenhoferstrasse 82, D-90480 Nuremberg (DE); Hagen Grünzig, Fraunhoferstrasse 28, D-01129 Dresden (DE)

( * ) Notice: Subject to any disclaimer, the term of this patent is extended or adjusted under 35 U.S.C. 154(b) by 382 days.

(21) Appl. No.: 10/098,267

(22) Filed: Mar. 15, 2002

(65) Prior Publication Data

US 2003/0173231 A1 Sep. 18, 2003

(30) Foreign Application Priority Data

Sep. 15, 1999 (DE) .......................................... 199 44 974

(51) Int. Cl.$^7$ ................................................ C23F 13/00
(52) U.S. Cl. ......................... 204/196.06; 204/196.07; 204/196.21; 204/196.36; 204/196.37; 204/402; 204/404; 204/416
(58) Field of Search ...................... 204/196.06, 196.07, 204/196.21, 196.36, 196.37, 402, 404, 416; 205/734, 724–728, 775.5, 776, 776.5

(56) References Cited

U.S. PATENT DOCUMENTS 4,861,453 A * 8/1989 Matsuoka et al. .......... 204/404
5,228,959 A    7/1993 Miller
5,296,120 A * 3/1994 Bennett et al. ........ 204/196.33
5,968,339 A * 10/1999 Clear .......................... 205/730
6,258,236 B1 * 7/2001 Hird ............................ 204/515
6,358,397 B1 * 3/2002 Lyublinski .................. 205/734
6,398,945 B1 * 6/2002 Henriksen ................... 205/734

FOREIGN PATENT DOCUMENTS

DE    42 29 072 A1    3/1994
EP    0 398 117 A2    11/1999

OTHER PUBLICATIONS

J. E. Slater; article in Materials Performance, Nov. 1976 (pp. 21–26).

* cited by examiner

*Primary Examiner*—Bruce F. Bell
(74) *Attorney, Agent, or Firm*—Patricia M. Mathers; Thomas L. Boltan

(57) ABSTRACT

Re-usable, energy-efficient apparatus for the restoration of corrosion-damaged reinforced concrete and a method for controlling the same. The apparatus includes a combination electrode device in a sandwich construction that includes a dimensionally stable electrode, a reusable electrolyte reservoir, an ion exchanger element, a reference electrode, a power-switching device for anodic regulation, and a measuring system for determining the capacity of the ion exchanger element to take up ions. Use of this combination electrode device prevents the formation of active chlorine during extraction of chlorine from reinforced concrete.

25 Claims, 3 Drawing Sheets

COMBINATION ELECTRODE FOR ELECTROCHEMICAL RESTORATION OF CORROSION-DAMAGED REINFORCED CONCRETE AND METHOD OF CONTROLLING SAME

BACKGROUND OF THE INVENTION

The invention relates to a combination electrode for the electrochemical restoration of corrosion-damaged reinforced concrete and a method of controlling the same.

Mineral based construction materials used in construction technologies, such as, concrete, cement, or mortar, are customarily reinforced with steel elements that are embedded for this purpose into the mineral-based construction material. In the case of a properly manufactured concrete element, these steel elements are coated with such a thick concrete layer that the steel element is, as a rule, permanently protected against corrosion. The corrosion protection of the concrete layer is based on the alkalinity of the water that is found in the pores of the concrete and is given when the pH-value is greater than 12.5. Under these conditions, a thin, adherent oxide film forms on the surface of the steel, which in practice completely prevents a corrosion of the steel element. For this reason, reinforced concrete can be used for external components that are subject to weather conditions. Under unfavorable conditions, however, especially in the case of faulty construction work and, particularly, if the structure is exposed to salts, the corrosion protection of the reinforcement can be impaired. Under such conditions, the concrete undergoes carbonatization when carbon dioxide from the air reacts with the alkaline components of the cement. The pH-value then drops, thereby reducing or eliminating the corrosion protection.

Another frequently occurring cause for corrosion is the ingression of chlorides into the concrete, for example, when concrete components are used as a roadway or in the vicinity of a roadway where de-icing salt is used. Both corrosion processes begin on the surface of the concrete and continue to work their way into the interior of the concrete to the steel components embedded therein, eventually causing the oxide film to dissolve. The concrete is destroyed by the spalling that results from the voluminous build-up of corrosion products. In order to prevent this, the concrete containing the chloride must be replaced, or the chloride itself must be removed from the concrete.

Various methods are known for replacing contaminated material. These methods are physical methods that entail the removal of contaminated material and its replacement with fresh concrete. This, however, is a costly solution because of the effort involved. Furthermore, it is only applied if an area has already been recognized as damaged.

For this reason, a method is proposed in which the chloride is removed electrochemically from the concrete by means of ionic migration. In this way, the chloride concentration in the concrete is drastically reduced, so that it is no longer necessary to replace the concrete. The method described by J. E. Slater in *Materials Performance,* 1976 (pp. 21–26) applies an electrical potential between the interior reinforcement and a surface electrode that is submerged in a liquid electrolyte provided on the surface of the concrete. The surface electrode thereby forms the positive pole of the electrical field which causes the negatively charged chloride ions that are contained in the concrete to migrate through the concrete, exit the concrete, and reach the electrolyte. The chloride ions are oxidized to gaseous chlorine in the electrolyte at the positive electrode, or they react chemically with components that are contained in the electrolyte. The method proposed by Slater, however, has several disadvantages: For one, this method requires that voltages between 100 and 120 V be applied. Such high voltages, which must be applied over a period of 24 hours in order to remove approximately 90% of the chloride from the concrete, are unacceptable for technical safety reasons. Furthermore, the costs thereby incurred can surpass even those of conventional technologies. For another, the liquid electrolyte used is restrained by dams that must be built on the surface of the concrete. The method can therefor be applied only to horizontal concrete surfaces. This restriction results in signficant expenditure for the preparation of the chloride removal, and moreover greatly restricts the applicability of the method. A further disadvantage of this method is that it does not particularly take into account non-homogeneities that are present in the reinforced concrete (concrete covering, concrete density, moisture content, reinforcement density relative to the surface of the concrete). When treating large-surface construction components these non-homogeneities can lead to significant variations in process intensity.

With respect to the latter mentioned problem, DE 4 229 072 A1 proposes an electrolyte reservoir with a resistance of R>>0, so that partial overheatings, e.g., with a single protruding reinforcement with the then resulting small $R_{Concrete}$, are compensated by the $R_{Electrolyte}$. A disadvantage of this method is that the process peaks are merely automatically cut off, without feedback control occurring in the case of a partial hypofunction ($R_{concrete}$ large).

U.S. Pat. No. 5,228,959 (Miller; issued 1993) proposes as the electrolyte an adherent layer that can be applied to vertical surfaces or even to the undersides of concrete elements and that adheres to the same. An electrode that constitutes the positive pole of the electrical system is embedded in the adherent layer. When the process is completed, that is, when the level of chloride contamination has been reduced to a desired level, the adherent layer, as well as the electrode, is removed from the concrete surface. The individual steps of the method comprise applying a removable adherent electrolyte layer onto the surface of the concrete; applying a d.c. voltage between the reinforcement and the electrode, to cause the negative ions to migrate; interrupting the applied voltage and removing the adherent layer when the desired level of ion migration has been achieved; periodically measuring the difference in potential between the reinforcement and the reference electrode and temporarily interrupting the d.c. voltage when the difference in potential indicates the formation of hydrogen. Although this method offers a number of advantages when compared to the method proposed by Slater, it does have the disadvantage that the electrochemical system can be used only once; re-use is impossible. Even though it states in U.S. Pat. No. 5,228,959 that the used material can be easily and inexpensively disposed of, this is no longer acceptable from the viewpoint of increasingly restrictive environmental standards and increasing disposal costs. Furthermore, the release of chlorine that is a by-product of the method is extremely harmful to the environment.

This method has been modified in several patent applications. EP 0 398 117 A1, for example, proposes a cellulose pulp as the material for the adherent electrolyte layer. The cellulose pulp can be premixed in a nozzle with water or another solution, such as calcium hydroxide, and sprayed onto the surface of the area to be treated. This patent application also proposes that a ferriferous material that is reactive in the presence of chlorine be used for the electrode, in order to minimize the release of free chlorine into the environment. This has the advantage of releasing less chlorine into the environment, but the disadvantage of not completely eliminating the formation of chlorine. Furthermore, the electrode disintegrates in the course of the application of the method so that, for this reason alone, the method can be used only once.

What is needed, therefore, is an electrochemical method of restoring corrosion-damaged reinforced concrete that is economical in terms of apparatus, energy demand, and time required to complete the restoration, and is safe to use. What is further needed is such a method that can be used on irregular, vertical, and downward facing surfaces of structures. What is yet further needed is such a method that is adjustable to the variations present in the properties of the area to be treated. What is still further needed is such a method that is environmentally non-polluting. And finally, what is needed is apparatus for carrying out and controlling the method, wherein the apparatus is usable for a multiple number of applications.

BRIEF SUMMARY OF THE INVENTION

For the reasons above, it is an object of the present invention to provide an electrochemical method of treating corrosion-damaged reinforced concrete that is economical in energy consumption and in apparatus requirements, as well as in time required to complete restoration of the concrete. It is a further object to provide such a method that can be used on irregular, vertical, and downward facing surfaces of structures. It is a yet further object to provide such a method that is adjustable to the variations in properties of the areas to be treated, is environmentally non-polluting and safe to use. And finally, it is an object to provide apparatus for carrying out and controlling the method according to the present invention, whereby the apparatus is usable for a multiple number of treatments.

According to the invention, these objects are achieved by providing a combination electrode device comprising a dimensionally stable electrode as the anode; a prefabricated, reusable electrolyte reservoir; a means for preventing evaporation; a prefabricated, exchangeable, anionic ion exchanger element; a central fastening device with an anchor, an anchor rod, and an eccentric quick-clamping device; a reference electrode on the anchor head; a wetting device; a power-switching device for anodic regulation; a measuring system for determining the condition of the ion exchanger element: as well as electrical connections for the reference electrode; etc. A sandwich construction is used to connect to each other the dimensionally stable electrode, the means for preventing evaporation, the electrolyte reservoir, and the ion exchanger.

The combination electrode according to the invention is small in area (ca. 0.6×0.6 m), relative to the component to be restored, is re-usable, and can be industrially prefabricated. Moreover, the electrode contains all components required for active process control. The multipart constructed combination electrode allows reactivation of the ion exchange material for reprocessing.

An essential advantage of the method according to the present invention is that no active chlorine is formed. The chloride ions extracted from the concrete are bonded to the ion exchange material, from which they can be removed by the reactivation of this material. The combination electrode is therefore reusable. The electrode is not self-adherent.

The dimensionally stable electrode is preferably made of surface-modified titanium, tantalum, or similar materials.

The electrolyte reservoir comprises a fibrous, mineral-based material, preferably glass mat. It thus behaves chemically neutral under extreme acidic or caustic conditions, and discolorations on the surface of the concrete are avoided; furthermore, it is geometrically constant and has good water-storage capacity.

The ion exchanger is so embodied that anionic ion exchanger material is attached to a perforated carrier and prefabricated in such a way that it can be inserted as a layer in the combination electrode, preferably between electrolyte reservoir and electrode. The electrode can herewith be used in all installation positions and be quickly and easily serviced when the ion exchanger is exhausted.

A distinguishing feature of the sensory technology for the on-line status control of the ion exchanger material is a measuring system that is disposed between the ion exchanger layer and the dimensionally stable electrode for the purpose of monitoring the consumption status. The measuring system is cyclically scanned by means of a computer. An auxiliary electrode or a chloride sensor is thereby integrated into the combination electrode. When chloride ions strike the auxiliary electrode, a measurable signal is generated.

Fastener, quick-clamping device, and reference electrode are embodied in such a way that a reference cell with a water-retaining, easily flexible diaphragm (for example, $MnO_2$ and water-saturated felt), is arranged on a plastic anchor. During operation, the anchor with the reference electrode is moved forward into a bore hole, which is preferably centrally situated in the electrode area and is a defined distance from the pertinent reinforcement. The sandwich part of the combination electrode is pushed onto the anchor rod and fastened by means of a sleeve that is fitted over the rod and held fast by an eccentric shaft with lever. The anchor rod has a hollow form for receiving the reference electrode feed line and has a set depth limit.

DETAILED DESCRIPTION OF THE INVENTION

Figure 1:
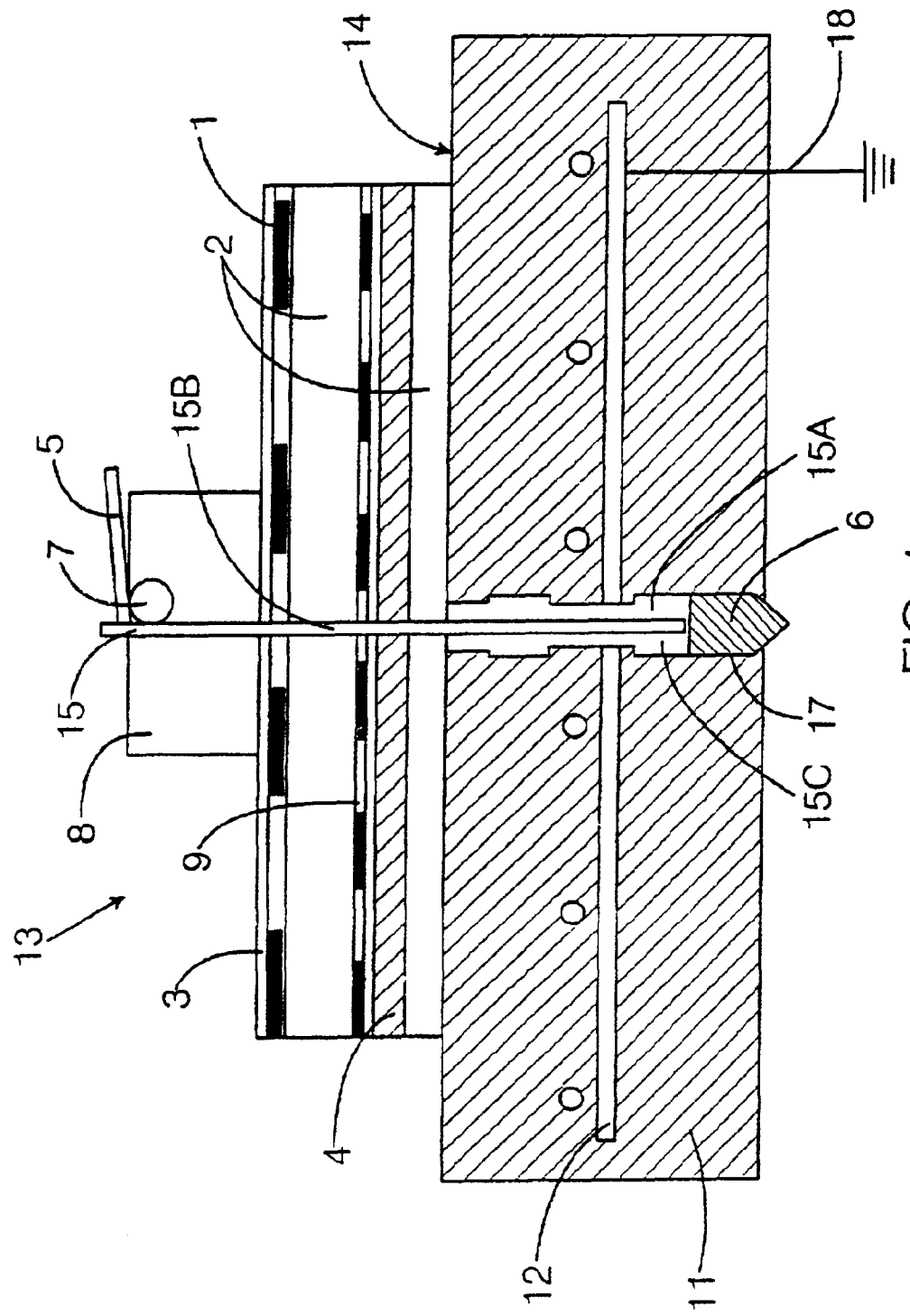
FIG. 1 is a schematic cross-sectional representation of the combination electrode device.

FIG. 1 is an illustration of the apparatus according to the invention, which includes a combination electrode device 13 having a dimensionally stable electrode 1; a prefabricated, reusable electrolyte reservoir 2; a means for preventing evaporation 3; and a prefabricated, exchangeable, anionic ion exchanger element 4, all of which are connected to each other in a combination sandwich construction. A reference electrode 6 is disposed on a first end 15C of a fastener 15 that includes an anchor 15A, an anchor rod 15B, and an eccentric quick-clamping device 5. Furthermore, the combination electrode 13 is equipped with a wetting device 7, a power-switching device for anodic regulation 8, a measuring system 9 for determining the condition on the ion exchanger element, as well as (not shown) electrical connections for the reference cell. The combination electrode device 13 is shown in FIG. 1 mounted on a reinforced concrete slab 11 and contacting a single reinforcement 12.

Figure 2:
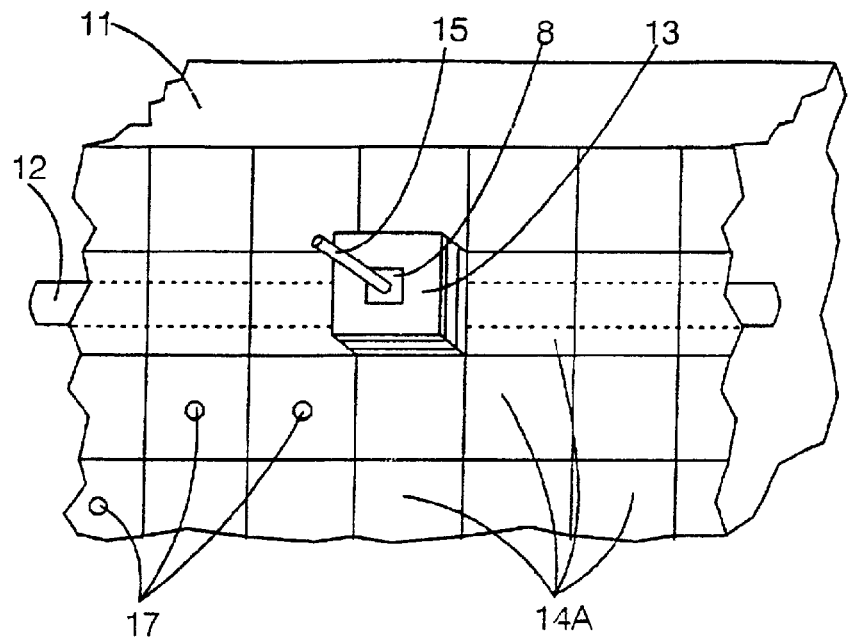
FIG. 2 is a block diagram illustrating the application of the combination electrode device according to the invention.

FIG. 2 shows the combination electrode device 13 being used on a concrete component 14 that is to be restored. The surface of the concrete component 14 is divided for this purpose into small grid-areas 14A. Such a sub-area is preferably 60×60 cm in size. The combination electrode device 13 is attached to one sub-area of concrete 14A that is to be restored by inserting the anchor 15A with the reference electrode 6 into a bore hole 17. As can be seen in FIGS. 1 and 2, the bore hole 17 is preferably centrally disposed within the surface of the electrode device 13 and a defined lateral distance from the pertinent reinforcement 12.

Figure 3:
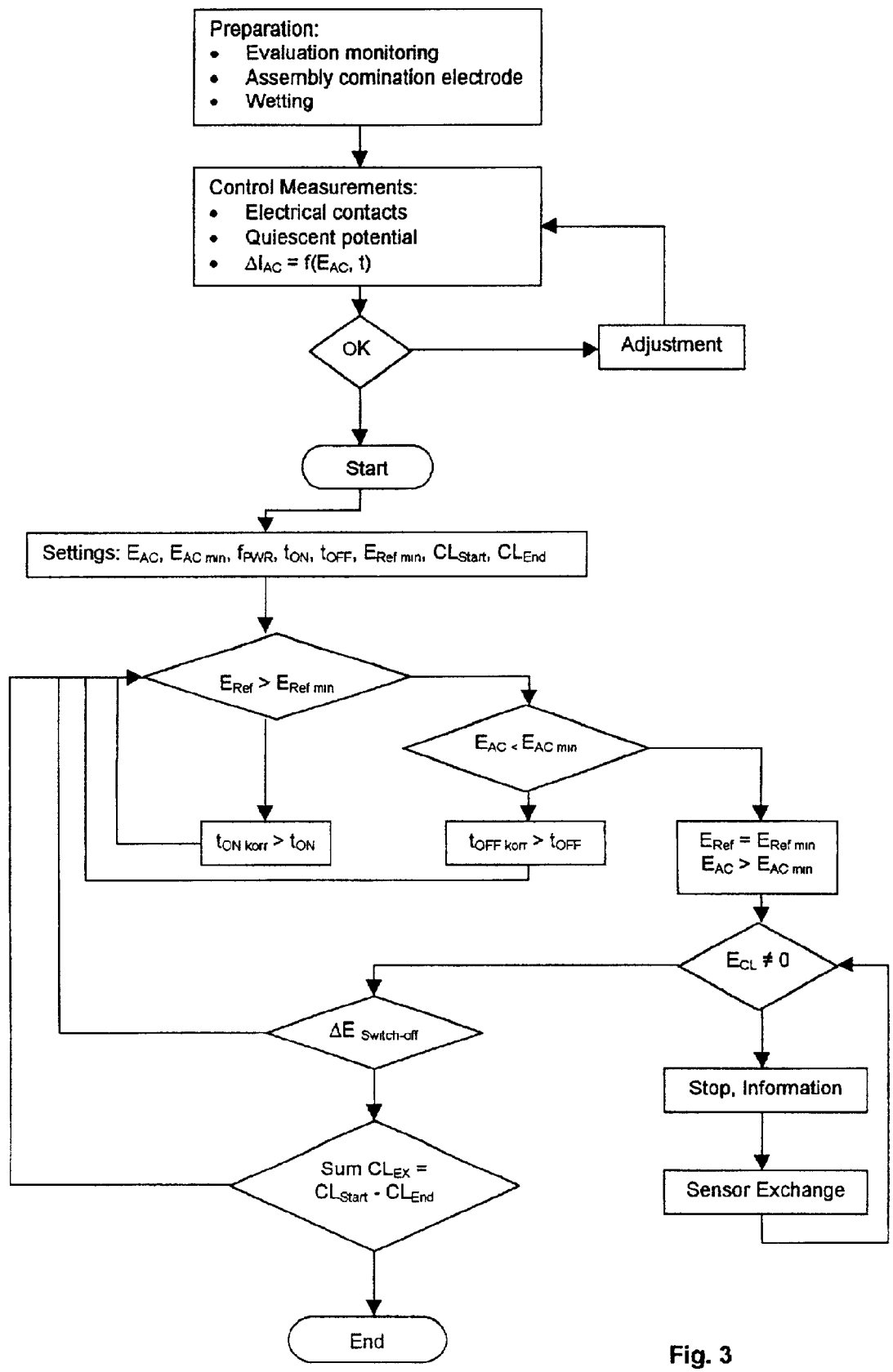
FIG. 3 is a flow chart that illustrates the method according to the present invention.

The aim of the method for controlling an electrode system is a rapid electrochemical restoration of corrosion-damaged reinforced concrete. FIG. 3 illustrates the steps of the method according to the invention. First, the two-dimensional area of the concrete component 14 to be restored is divided into any number of grid areas 14A of equal size, preferably into areas 0.6×0.6 m. The electrochemical, physical, and chemical characteristics are then determined by measuring the quiescent potential, measuring the galvanic pulse, recording the progression of the reinforcement of the cover reinforcement, the concrete covering, and determining the pore volume, the moisture, the chloride content, and the depth of carbonization. One combination electrode device 13 is assembled on each of the grid areas 14A to be restored and control measurements are carried out on each grid area 14A in order to determine the quiescent potential ($E_{Ref}$), to check the electrical contacts, and to determine the temporal change of the current as a result of an external voltage ($\Delta I_{AC}$). The initial values are entered into the control program, These values include for each grid area 14A the terminal voltage between anode and cathode ($E_{AC}$), the minimum terminal voltage without external voltage ($E_{AC,\ min}$), the frequency of the pulse-width modulation ($f_{PWR}$), the switch-on time of the external voltage ($t_{ON}$), the switch-off time of the external voltage ($t_{OFF}$), the minimum cathodic reference potential ($E_{Ref,\ min}$), the chloride content at the start of restoration ($CL_{Start}$), and the targeted chloride content ($CL_{End}$). The measurement, control, and abort criteria for each individual grid area 14A are entered. Then, direct current is supplied to the grid area 14A under constant monitoring of: the reference potential during the course of restoration, the change in voltage on the chloride sensor, and the switch-off slope, whereby the direct current power supplied during the course of restoration is regulated by pulse-width modulation such that the power supplied corresponds to the energy requirements of the particular grid area 14A to be restored.

The structure to be restored is examined prior to implementation of the method according to the invention with respect to its specific features, such as, the distance of the shell area of the cover reinforcement as working electrode, as well as to determine the average and minimum concrete covering at each grid area 14A. The control measurements simultaneously serve to check the electrical connections, as well as to obtain a low electrolyte resistance in the concrete by ensuring sufficient component moisture.

Monitoring the change in voltage on the chloride sensor includes constant polling of an auxiliary electrode, so as to determine the saturation of the ion exchanger. The abort criteria, which are monitored on each grid area throughout the entire course of restoration, are selected from the group of criteria that includes the total chloride amount contained in the ion exchanger 4 that corresponds to the difference between the chloride content in the concrete at the start of restoration ($Cl_{Start}$) and the targeted chloride content ($Cl_{End}$); the 100 mV criterion that serves to estimate the alkalinity reserve; and the recorded quantity of charge.

When applying the method according to the invention, precisely that amount of direct current power that the respective area requires is supplied to each grid area during restoration. This power demand is constantly recalculated for each grid area 14A to be restored. If the capacity of the ion exchanger 4 is exhausted, it can be repeatedly renewed during restoration.

The constant polling of the chloride sensor enables a precise determination of the saturation of the ion exchanger in the combination electrode. If the ion exchanger is saturated, then the restoration method is automatically interrupted for the particular grid area 14A, so that chlorine gas cannot form at the anode. Simultaneously, the chloride amount that corresponds to the take-up capacity of the ion exchanger 4 is included in the restoration process as a computation value.

Pulse-width modulation is used to reduce the direct current power of the electrode 1. The pulse-width modulation encompasses an on-off controller with the conditions ON and OFF. An effective power at the consumer, i.e., at the grid areas 14A, is obtained by varying the time ratios of the ON and OFF phases. It is not possible to reduce the direct current demand by reducing the direct current power with a conventional longitudinal controller because the unused energy in the controller is converted into heat. Using pulse-width modulation according to the invention prevents this. Aided by the pulse-width modulation and based on the modular design, which provides individual control of each grid area 14A, the energy demand of each grid area 14A is optimally determined, so that the supplied power can be adjusted to the power demands.

The d.c. voltage available for all electrodes 1 of the restoration surface is switched by a control computer 30, supplied to the electrodes 1, and, according to energy demands, regulated as a pulse-width modulated square-wave voltage with minimum power losses. An individual r.m.s. voltage or an individual r.m.s. current results between anode and cathode, the voltage or current being re-measured for each control cycle and optimally adjusted to the kinetic ratios at each electrode. Furthermore, the cathodic potential measured at the reference electrode and falsified by the ohmic resistance of the concrete 11 between the restoration and the reference electrode 6 can be corrected via the control computer 30 by measuring and evaluating the steepness of the switch-off slope on the pulse-width control module at each electrode (IR compensation).

When using the method according to the invention, each grid area 14A or each group of grid areas can be treated as required by the actual degree of damage, due to the modular design of the combination electrode device 13. Each grid area 14A or each group of grid areas can continue to be treated individually by the delay time control, depending on the progress of the restoration. By using the pulse-width modulation, a low-loss power feed and power control are individually obtained for each grid area 14A, as a function of its requirements, thus enabling optimal restoration. Furthermore, additional large-area safety allowances for preventing process overheating are not required, because each grid area 14A is treated with reference to the respective cathodic reference potential. In this way, process reserves are utilized and, furthermore, it is guaranteed that no damages to the structure occur. The fact that the process automatically switches off as soon as the capacity of the ion exchanger for accepting chloride is exhausted is an advantage, as this prevents the formation of environmentally polluting chlorine. Thus, the method is, to a high degree, environmentally friendly, compared to conventional methods.

Furthermore, the invention is characterized by a better reinforcement analysis in conjunction with small-area electrodes, whereby the method is directed at the jacket area of the effective reinforcement and does not—as do the methods of the prior art—make the simplifying and incorrect assumption that the reinforcement area is identical with the concrete surface. The method can be individually adjusted and optimized, on the basis of known electrode areas, as well as current density distributions.

The pulse-width modulation used according to the invention enables individual and dynamic process control of each individual combination electrode device 13 (0.6×0.6 m) without greater power losses relative to the otherwise conventional constant or regulated current sources. Furthermore, the method achieves an increase in efficiency by staggering the active times of different combination electrodes 1 in such a way that the maximum capacity of the system can be dimensioned below the total capacity of all composite electrodes. The pulse-width modulation makes it possible to have an r.m.s. voltage for each combination electrode 1 according to the thermodynamic conditions within the reinforcement area that is scanned by the combination electrode device 13. Parameters of the pulse-width modulation are frequency and pulse duty ratio, which, starting from the initial set values, are constantly adjusted during the process. Using pulse-width modulation, it is not necessary to limit the current for the connected electrode. For safety reasons, the available d.c. voltage is set at 40 V.

According to the method, the unwound jacket area of the cover reinforcement is, thus, an essential output parameter. The electrode area of the operating electrode (reinforcement, cathode) has previously been determined to be non-destructive. As a result, the current distribution is substantially better measured and optimized than it is with the conventional line of thinking, which equates the electrode area with the concrete surface and, as a result, can arrive at completely incorrect reference values.

Furthermore, it is currently impossible to perform chloride measurements in the electrical field. The chloride sensor used according to the invention as a threshold switch indicates when the ion exchanger cannot take up additional chloride ions. This allows definite conclusions to be drawn regarding the achieved extraction of chloride. In addition, unintentional formation of chlorine at the anode is prevented, because the aforementioned threshold signal results in the pertinent combination electrode being switched off. The switched-off condition is maintained until the exhausted ion exchanger 4 is renewed.

The illustrated use of pulse-width modulation makes the function of a switch-off slope of the pulse-width-modulated d.c. voltage applicable for continuous IR correction only when such switch-off slopes are available for evaluation in temporally very rapid successions. Because of the significantly increased dot layer of the IR drop-off measurements (resolved according to place and time), safety limits of the process (avoidance of formation of $H_2$) can be significantly better utilized, resulting in sustained greater effectivity.

Finally, the method is distinguished by the possibility of parallel local or remote control. As a result, several restoration projects can be operated and managed simultaneously, comfortably and conservatively with regard to resources.

Using the standardized Ethernet network, for example for connecting the combination electrodes with cables to a remote-location control computer 33, as well as decoupling additional units, guarantees the highest degree of flexibility and the best connection possibilities. Authorized third parties (general contractors, owners), using the remote-location control computer 33, can thereby access timely information regarding the process.

Figure 4:
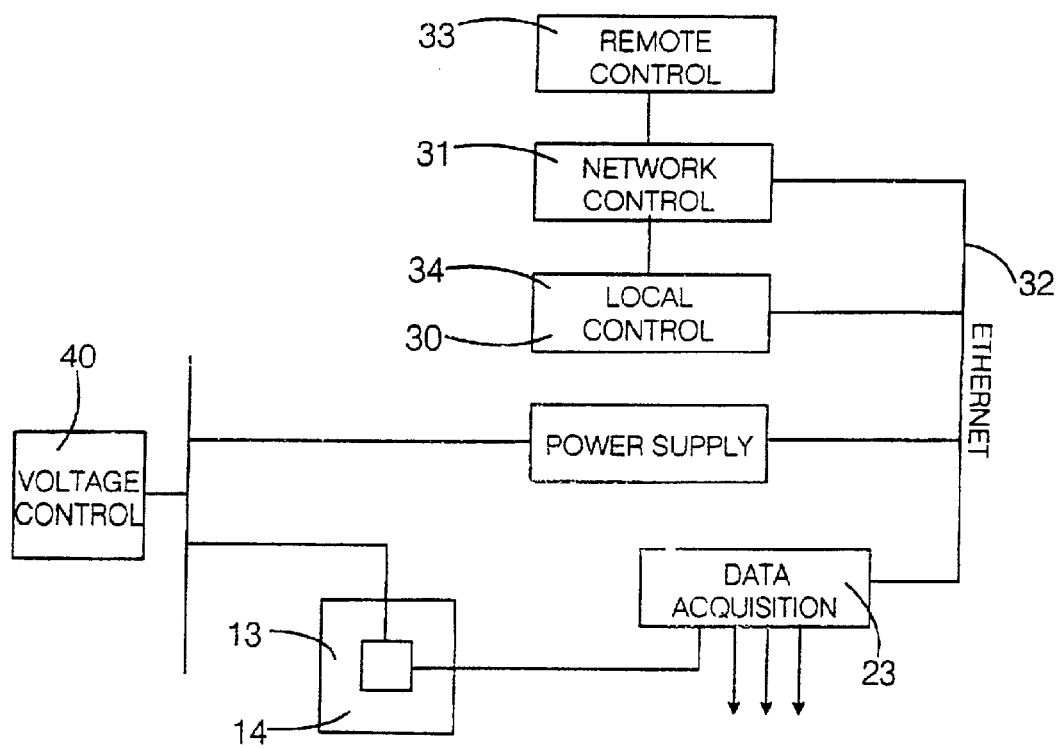
FIG. 4 is a block diagram of apparatus according to the invention, including the combination electrode device of FIG. 1.

Referring now to FIGS. 1, 2, 3, and 4, the method according to the invention is further explained as follows: To implement the method, the combination electrode device 13 described above is used. The electrode device 13 is attached to a grid area 14A approximately 0.6×0.6 m in size on the two-dimensional reinforced concrete surface 11 to be restored. The steel reinforcement 12 contained within the concrete 11 is connected to a grounding conductor 18. The combination electrode device 13, which has a sensor output and a control input, is connected to sensor electronics 23 via a sensor cable for the purpose of recording measured values and connected to control electronics via a control cable for the purpose of regulating the power, as well as to a direct current bus. Two electronic modules are connected to a control computer 30, which can be a remote-location control 33 or a local control unit 34, via network electronics 31 and an Ethernet network 32, as shown in FIG. 4.

The necessary preparations encompass an assessment of the condition of the structure, for example, with regard to the spacing of the reinforcement elements, the partitioning of the concrete surface 14 into individual grid areas 14A, the mounting the combination electrodes devices 13, as well as sufficiently wetting the concrete. Once these preparations have been completed, control measurements are taken to check the electrical contacts, to determine the quiescent potential and the change in the current resulting from the external voltage ($\Delta I_{AC}$), i.e., from the extraction current. The change in current $\Delta I_{AC}$ is a function of the terminal voltage between the anode and cathode ($E_{AC}$) and time. If these values correspond to the predetermined values, then the remaining method steps can be performed; otherwise, the values must be readjusted.

Subsequent to the preparation steps, the initial values are set via control electronics. These values include the terminal voltage between anode and cathode ($E_{AC}$, maximum 40 V), the minimum terminal voltage without external voltage ($E_{AC, min}$, e.g., 20 V), the OFF terminal voltage between anode and cathode ($E_{Ac, off}$), the frequency of the pulse-width modulation ($f_{PWR}$, wherein $f_{PWR}=t_{ON}+T_{OFF}$), the switch-on time of the external voltage ($t_{ON}$), the switch-off time of the external voltage ($t_{OFF}$), the minimum cathodic reference potential ($E_{Ref, min}$), the chloride content at the beginning of restoration ($CL_{Start}$, e.g., 3.0 M %, relative to the cement mass), and the targeted chloride content ($CL_{End}$, e.g., 0.3 M%, relative to the cement mass).

After determining the measurement, control, and abort criteria, direct current is supplied to the grid area 14A. During this process, the control computer continuously checks whether the reference potential at the cathode ($E_{Ref}$) is greater than the cathodic reference potential ($E_{ref, min}$) that has been set as the threshold value (e.g., −1070 mV vs. $Cu/CuSO_4$). If this is the case, the correction value of the switch-on time ($t_{ON, corr}$) is set higher than the predetermined switch-on time ($t_{ON}$) of the external voltage, so that the direct current can continue to be supplied. If the voltage reaches or goes below $E_{Ref, min}$, then the electrode can be turned off, and the OFF terminal voltage between anode and cathode ($E_{AC, OFF}$) checked to see if it is lower than the minimum terminal voltage without extreme voltage ($E_{AC, min}$). If this is the case before $T_{OFF}$ is completed, then the correction value of the switch-off time ($t_{OFF\ corr}$) is set lower than the switch-off time ($T_{OFF}$) of the external voltage, so that the direct current can continue to be supplied. If $E_{AC,\ OFF}$ is greater than $E_{AC}$ and the reference potential at the cathode ($E_{ref}$) is the same as the minimum predetermined cathodic reference potential ($E_{ref,\ min}$), then a check is subsequently performed to assess whether a change in voltage on the chloride sensor ($\Delta E_{CL}$), the so-called "break-through potential", which lies in the millivolt range, is not equal to zero. If $\Delta E_{CL}$ is not equal to zero, then the method is interrupted, the ion exchanger 4 is renewed, and, finally, the method is continued while the $\Delta E_{CL}$ is rechecked. If $\Delta E_{CL}$ is equal to zero and the difference between the chloride content at the beginning of restoration ($CL_{Start}$) and the targeted chloride content ($CL_{End}$) is equal to the sum of the eliminated amount of chloride, then the change of the reference potential after the external voltage is switched off, e.g., a minimum of 100 mV/4 hours, is determined. If the value is not undercut, the restoration goal is attained, so that the method is completed. Otherwise, the method is continued.

The embodiment of the apparatus and the steps of the method according to the invention mentioned herein are merely illustrative of the present invention. It should be understood that variations in construction of the apparatus and in the steps of the method may be contemplated in view of the following claims without straying from the intended scope and field of the invention herein disclosed.

What is claimed is:

1. A combination electrode device for the electrochemical restoration of a corrosion-damaged reinforced concrete having a reinforcing element, said combination electrode comprising:
   an electrolyte reservoir;
   an electrode that is dimensionally stable;
   an ion exchanger element; and
   a measuring system for measuring a saturation condition of said ion exchanger element;
   a reference electrode that is electrically connected to said measuring system; and
   a power switching device for anodic regulation, electrically connected to said electrode,
   wherein said electrode, said ion exchanger element, and said measuring system are in contact with said electrolyte reservoir.

2. The combination electrode device according to claim 1 having a sandwich construction, wherein said electrolyte reservoir has an upper face and a lower face, said electrode is disposed above said upper face, said ion exchanger element is disposed toward said lower face, and said measuring system is disposed between in said electrolyte reservoir between said electrode and said ion exchanger element.

3. The combination electrode device according to claim 1, wherein said reinforced concrete has a treatment area and said electrolyte reservoir is adapted to provide a working area that is commensurate with said treatment area.

4. The combination electrode device according to claim 3, wherein said working area is approximately 0.6×0.6 m.

5. The combination electrode device according to claim 1, wherein said electrode is made of material from the group consisting of surface-modified titanium, tantalum, and similar materials.

6. The combination electrode device according to claim 1, wherein said electrolyte reservoir is made of a fibrous, mineral material.

7. The combination electrode device of claim 6, wherein said fibrous mineral material is glass mat.

8. The combination electrode device according to claim 1, wherein said ion exchanger element includes an anionic ion exchange material that is fixed to a perforated carrier that is insertable as a layer between said electrolyte reservoir and said electrode.

9. The combination electrode device according to claim 1, further comprising a means for preventing evaporation from said electrolyte reservoir.

10. The combination electrode device according to claim 1, wherein said measuring system is connected to a computer network via instrument electronics and cyclically determines said saturation condition of said ion exchanger element.

11. The combination electrode device according to claim 1, wherein said measuring system includes an ion sensor.

12. The combination electrode device according to claim 11, wherein said ion sensor is an auxiliary electrode.

13. The combination electrode device according to claim 11, wherein said ion sensor is a chloride sensor.

14. The combination electrode device according to claim 1, wherein said reinforced concrete has a treatment area and a bore hole disposed in said treatment area, said device further comprising a fastening means that includes an anchor with an anchor head that is insertable in said bore hole, said anchor having a quick-clamping means at a first end for fastening said anchor in said bore hole.

15. The combination electrode device according to claim 14, wherein said reference electrode is disposed on said anchor head.

16. A method of rapid electrochemical restoration of a corrosion-damaged reinforced concrete component having a cover reinforcement and a treatment area, said method using said combination electrode device of claim 1 and comprising the steps of:
   a) determining an unwound shell area of said cover reinforcement;
   b) assembling said combination electrode device on said treatment area;
   c) applying a constant operating voltage to said electrode;
   d) regulating said constant voltage by means of a pulse-width-modulated d.c. voltage;
   e) monitoring a saturation level of said ion exchanger element with a chloride sensor that sends an output signal indicating a saturation condition of said ion exchanger element to said measuring system; and
   e) monitoring a constant IR correction by means of a switch-off slope of said pulse-width-modulated d.c. voltage.

17. The method according to claim 16, wherein said pulse-width-modulated d.c. voltage is applied to said combination electrode device that is assembled on said treatment area, wherein said combination electrode device provides signals required for regulating said pulse-width-modulated d.c. voltage.

18. The method according to claim 16, further comprising the step of adjusting a frequency and a pulse duty ratio of said pulse-width-modulated d.c. voltage to pre-determined control settings.

19. The method according to claim 16, wherein a working area of a cathode of said electrode is equal to said unwound shell area.

20. The method according to claim 16 further comprising the steps of:
   a) detecting a signal from said chloride sensor by said measuring system;

b) signaling a saturation condition of said ion exchanger element by said measuring system; and c) switching-off said operating voltage to said electrode.

21. The method according to claim 16 further comprising the step of performing continuous IR correction of a reference potential of said combination electrode by measuring and evaluating a voltage drop at a switch-off slope of a level adjustment.

22. An electrode system for rapid electrochemical restoration of corrosion-damaged reinforced concrete having a treatment area with a bore hole, said system comprising:

a combination electrode assembly according to claim 1, wherein said electrode assembly is assembled on said treatment area;

a reference electrode that is insertable in said bore hole;

an external power supply for supplying an operating voltage to said combination electrode;

a wetting device that maintains sufficient moisture on said electrolyte reservoir;

a control unit for regulating operation of said electrode assembly; and a linking means for linking said measuring system of said electrode assembly with said control unit.

23. The apparatus of claim 22, wherein said control unit includes a computer system that is adapted to receive signals from and send signals to said measuring system, wherein said measuring system has a signal output and a signal input, and wherein said linking means connects said signal output and said signal input, respectively, with said computer.

24. The apparatus of claim 22, wherein said computer system includes a local computer, a remote location computer, and said linking means includes a first link to said local computer and a second link to said remote-location computer by means of a telecommunications link.

25. The apparatus of claim 24, wherein said telecommunications link is an Ethernet link and said linking means connects said measuring system in parallel with said local computer and said remote-location computer.

* * * * *

UNITED STATES PATENT AND TRADEMARK OFFICE
CERTIFICATE OF CORRECTION

PATENT NO. : 6,881,306 B2
DATED : April 19, 2005
INVENTOR(S) : Ulrich Schneck, Thomas Winkler and Hagen Grunzig It is certified that error appears in the above-identified patent and that said Letters Patent is hereby corrected as shown below:

Title page,
Item [74], *Attorney, Agent, or Firm*, replace "Boltan" with -- Bohan --.

Column 8,
Line 17, replace "output" with -- output 21 --.
Line 18, replace "input" with -- input 22 --.
Line 18, replace "23" with -- 20 --.
Line 19, replace "cable" with -- cable 23 --.
Line 20, replace "electronics" with -- electronics 24 --.
Line 20, replace "cable" with -- cable 25 --.
Line 22, replace "bus" with -- bus 26 --.
Line 22, replace "modules" with -- modules 27A, 27B --.

Signed and Sealed this

Sixth Day of September, 2005

JON W. DUDAS
*Director of the United States Patent and Trademark Office*